United States Patent [19]

Ishikawa

[11] 3,708,719

[45] Jan. 2, 1973

[54] SAFETY DEVICE IN MOTOR WINCH
[75] Inventor: Shogo Ishikawa, Kawasaki, Japan
[73] Assignee: Kabushiki Kaisha Kito, Kanagawa-ken, Japan
[22] Filed: June 21, 1971
[21] Appl. No.: 154,836

[30] Foreign Application Priority Data

June 23, 1970 Japan..............................45/54038

[52] U.S. Cl..................317/13 R, 307/127, 317/48, 318/207 R
[51] Int. Cl..............................................H02h 7/09
[58] Field of Search..........317/13 R, 48; 318/207 R; 307/127

[56] References Cited

UNITED STATES PATENTS

| 2,975,334 | 3/1961 | Callan | 317/48 |
| 3,467,833 | 9/1969 | Sandgren | 317/48 X |
| 3,551,749 | 12/1970 | Hore | 317/48 |

*Primary Examiner*—James D. Trammell
*Attorney*—John J. McGlew et al.

[57] ABSTRACT

A safety device includes a resistance, a condenser and a relay winding which are star-connected across a three-phase source of AC potential providing the supply potential for a three-phase motor which is controlled, as to operation in the normal and reverse directions, by a three-phase magnetic contactor connected to the motor by forward or normal and reverse end limit switches. The safety device further includes a normally closed contact which is opened upon energization of the relay winding, and this contact is connected in series in the control circuit of the electromagnetic contactor. This control circuit is connected to the same single phase as is the series connection of the condenser and the relay winding. If the three-phase source of AC potential does not have the proper phase sequence, or if a single phase is inoperative, the relay winding is sufficiently energized to open the normally closed contact and thus interrupt energization of the magnetic contactor with resultant de-energization of the three-phase motor driving the winch.

3 Claims, 5 Drawing Figures

INVENTOR.
SHOGO ISHIKAWA
BY John J. McGlew
ATTORNEY 3,708,719

SAFETY DEVICE IN MOTOR WINCH

FIELD OF THE INVENTION

This invention relates to three-phase motors, particularly to such motors driving portable winches, and more particularly to a novel, improved and simplified safety device for preventing operation of a three-phase AC winch motor responsive to improper phase sequence of a three-phase AC source of potential or a failure of one or more phases of the source.

SUMMARY OF THE INVENTION

This invention is directed to a safety device for connecting a winch, driven by a three-phase AC motor, to a three-phase AC source of potential, and operable to protect the winch and to secure safety of winch operation by preventing operation of the winch in case of an improper phase sequence or phase reversal of the three-phase AC source of potential or in the case of failure of one or more of the phases of the source. To this end, the safety device comprises a resistor, a condenser and an electromagnetic relay winding star-connected to the three-phase source of AC potential, with the relay winding controlling a normally closed relay contact connected in series in a control circuit for an electromagnetic contactor, of the motor-reversing type, connecting the winch motor to the three-phase AC source in series with normal and reverse end limit switches.

The control circuit of the electromagnetic contactor is connected across a single phase of the AC source, and the series connection of the condenser and the relay winding is also connected across the same single phase of the source. By virtue of these connections, the safety device assures safety of operation of the motor winch by making impossible operation of the winch in case of phase reversal or phase failure of the three-phase AC source, with the relay winding being sufficiently energized, in case of such phase reversal or phase failure, to open the relay contact in the control circuit resulting in de-energization of the electromagnetic contactor and corresponding de-energization of the winch motor, or resulting in inability to close the magnetic contactor for operation of the motor in either direction.

For an understanding of the invention, reference is made to the following description of a typical embodiment thereof as illustrated in the accompanying drawing.

DESCRIPTION OF THE PREFERRED EMBODIMENT

Figure 1:
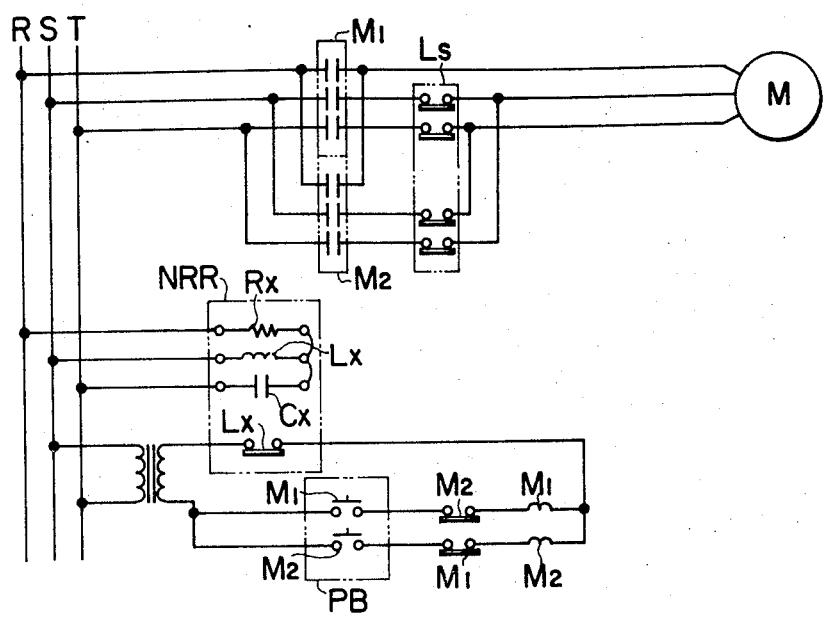
FIG. 1 is a schematic wiring diagram illustrating the safety device of the present invention connected in the energization and control circuit of a winch driven from a three-phase AC source of potential by a three-phase AC motor controlled by a reversing type magnetic contactor connected to the motor in series with normal and reverse end limit switches.

Referring first to FIG. 1, a three-phase source of AC potential is represented by the three conductors R, S and T. A magnetic contactor including a normal or forward set of contacts M1 and a reverse set of contacts M2 is connected between the conductors R, S and T and a three-phase AC motor M driving a winch, end limit switches Ls being connected in series between each section of the magnetic contactor and motor M. A control circuit for the magnetic contactor is connected, through the medium of a transformer, across the phase S-T of the three-phase source, and includes a "normal" or "forward" normally open manually operable push button M1 and a "reverse" normally open manually operable push button M2. Push button M1 is connected, in series with a normally closed contact M2 of the "reverse" section M2 of the magnetic contactor to an operating winding M1 for closing the normally open contacts of the "forward" section M1 of the magnetic contactor. Push button M2 is connected in series with the normally closed contact M1 of the "forward" section M1 of the magnetic contactor in series with the operating winding M2 for closing the normally open contacts of the "reverse" section M2 of the magnetic contactor. It will be noted that the operating windings M1 and M2 are connected in parallel with each other but in series in the control circuit, with each operating winding being connected in series with its associated manually operated push button and the associated normally closed interlocking contact of the other section of the magnetic contact.

In accordance with the invention, a safety device NRR is connected to the three-phase AC source and controls operation of a normally closed relay contact Lx connected in series in the control circuit, so that when contact Lx is open, it is not possible to energize the magnetic contactor M1-M2 for motor operation in either direction. The safety device includes a resistance Rx, a relay winding Lx and a condenser Cx which are star-connected to each other and to the three-phase conductors R, S and T. It will be noted that the series connection of relay winding Lx and condenser Cx is connected across the phase S-T, which is the same phase having the control circuit connected thereacross. When relay winding Lx is sufficiently energized, as described hereinafter, it opens contact Lx to open the series control circuit connected to phase S-T.

Figures 2A, 2B, 2C:
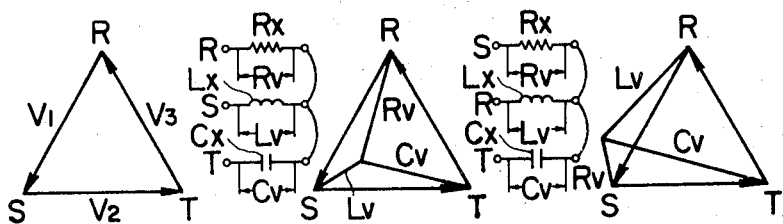
FIG. 2a is a vector diagram of the three-phase voltage of the source.
FIG. 2b is a diagram illustrating the correct phase connections and the corresponding vector diagram with a proper phase sequence.
FIG. 2c is a diagram, similar to FIG. 2b, showing the conditions with a phase reversal.

Referring to FIG. 2a, the vector diagram illustrates voltage vectors V1, V2 and V3, the voltage vector V1 being the potential between conductors R and S, the voltage vector V2 being the potential between conductor S and conductor T and the voltage vector V3 being the potential between conductor T and conductor R.

With this phase sequence, the connections of the safety device are as indicated at the left in FIG. 2b, with the voltage across the resistor being indicated at Rv, that across the relay winding being indicated at Lv and that across the condenser being indicated at Cv. The resultants of these three voltages are indicated in the vector diagram at the right of FIG. 2b, and it will be noted that the voltage Lv has a relatively small magnitude.

On the other hand, and as shown in FIG. 2c, when there is a phase reversal as indicated at the left in FIG. 2c, the resultant vector diagram is as indicated at the right in FIG. 2c. As indicated at the left of FIG. 2c, with the phase reversal, resistance Rx is connected to conductor S rather than to conductor R, and the relay winding Lx is connected to conductor R rather than to conductor S. In this case, the voltage Lv across the relay winding has a much larger magnitude and one which is sufficient to effect opening of contact Lx, thus breaking the control circuit for the magnetic contactor and preventing operation of the magnetic contactor.

Figure 3:
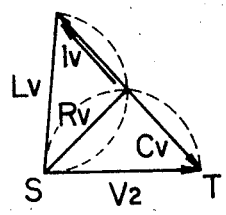
FIG. 3 is a vector diagram illustrating the conditions upon failure of a phase of the three-phase source of potential, or the "open phase" condition.

The case with a phase reversal, resulting in there being, in effect, only a single-phase supply, is illustrated in FIG. 3. FIG. 3 illustrates the condition in which the R phase is open and again it will be noted that the voltage Rv across the relay winding Lx has a relatively large magnitude sufficient to effect opening of the contact Lx in series in the control circuit.

In the event the S phase is open, the voltage between conductors S and T naturally decreases to substantially 0. The potential between conductors S and T is that used for the control circuit, so that the electromagnetic contactor M1–M2 cannot be operated as there is no voltage available at the control circuit when the S phase is open. The same holds true in case the T phase is open. Thus, the safety device makes impossible operation of the winch except in the case where three-phase AC power is supplied with a proper phase sequence in which all phases are operative, with operation of the winch being impossible with a phase reversal or the failure of one or more phases. From FIG. 3, it will be noted that the voltage Lv as opposed to the voltage V2 between conductors S and T is impressed on relay winding Lx so that contact Lx is open to open the control circuit.

As a practical example, with a potential difference between conductors R and S of 220V, the resistor is a resistor Rv (V) of 15 kilo-ohms and 15W, the relay winding is a winding Lv (V) of 200V, the condenser is a condenser Cv (V) of 1mF and 600V and the relay operating voltage is 150V. The voltages at each component of the relay are then as indicated in the following table:

|  | Rv(V) | | Cv(V) | | Lv(V) | |
| --- | --- | --- | --- | --- | --- | --- |
|  | 50 Hz | 60 Hz | 50 Hz | 60 Hz | 50 Hz | 60 Hz |
| Positive phase | 170 | 175 | 160 | 155 | 61 | 65 |
| Negative phase | 48 | 35 | 245 | 245 | 190 | 210 |
| Open-phase of R phase | 0 | 0 | 280 | 290 | 170 | 215 |
| Open-phase of S phase | 98 | 115 | 190 | 180 | 0 | 0 |
| Open-phase of T phase | 135 | 130 | 0 | 0 | 96 | 105 |

While a specific embodiment of the invention has been shown and described in detail to illustrate the application of the principles of the invention, it will be understood that the invention may be embodied otherwise without departing from such principles.

What is claimed is

1. A safety device, for a three-phase motor operating a winch and connected to a three-phase source of A.C. potential through a motor reversing magnetic contactor in series with forward and reverse end limit switches, the magnetic contactor having forward and reverse operating windings in a series control circuit energized from a single phase of such source of A.C. potential, said safety device comprising, in combination, a resistance, a condenser and a relay winding star-connected to each other and to said source with said relay winding being connected across said single phase; and a normally closed relay contact controlled by said relay winding and connected in said control circuit in series with said operating windings; said relay winding being energized to open said normally closed relay contact responsive to a phase reversal of said source or failure of a phase of said source.

2. A safety device for a three-phase AC motor, as claimed in claim 1, including first, second and third conductors connected to respective terminals of said three-phase source; said resistance, condenser and relay winding having first ends connected to each other; the second ends of said condenser, said relay winding and said resistance being connected to said first, second and third conductors, respectively; said control circuit being connected to said first and second conductors.

3. A safety device for a three-phase AC motor, as claimed in claim 1, in which said operating windings are connected in parallel with each other in said series control circuit, and each in series with a respective manually operable normally open push button.

* * * * *